United States Patent [19]

Lawson

[11] 3,717,986
[45] Feb. 27, 1973

[54] ASPARAGUS HARVESTER
[75] Inventor: Lewis E. Lawson, LeSueur, Minn.
[73] Assignee: Green Giant Company, LeSueur, Minn.
[22] Filed: Jan. 17, 1966
[21] Appl. No.: 521,021

[52] U.S. Cl. ............................................... 56/327 A
[51] Int. Cl. ................................................. A01d 45/00
[58] Field of Search ......... 56/327, 11, 121.41, 121.46

[56] References Cited

UNITED STATES PATENTS

| | | | |
|---|---|---|---|
| 2,525,018 | 10/1950 | Corwin | 56/327 UX |
| 2,767,544 | 10/1956 | Turkington | 56/327 |
| 3,066,469 | 12/1962 | Chatagnier | 56/327 |
| 3,176,456 | 4/1965 | Franzen | 56/327 |
| 3,222,851 | 12/1965 | Schnaidt et al. | 56/11 |
| 3,286,448 | 11/1966 | Moore | 56/208 |

*Primary Examiner*—Hugh R. Chamblee
*Attorney*—Molinare, Allegretti, Newitt & Witcoff

[57] ABSTRACT

Apparatus for harvesting asparagus. A movable frame has cutting means mounted thereon for severing asparagus spears of a selected height as the frame travels in an asparagus field. A pair of cooperating endless belts are provided for gripping, firmly and gently, the selected asparagus spears from their opposite sides, taken relative to the direction of travel of the frame. The gripping of the spears by the endless belts occurs before, during, and after the cutting means severs the said spears.

3 Claims, 17 Drawing Figures

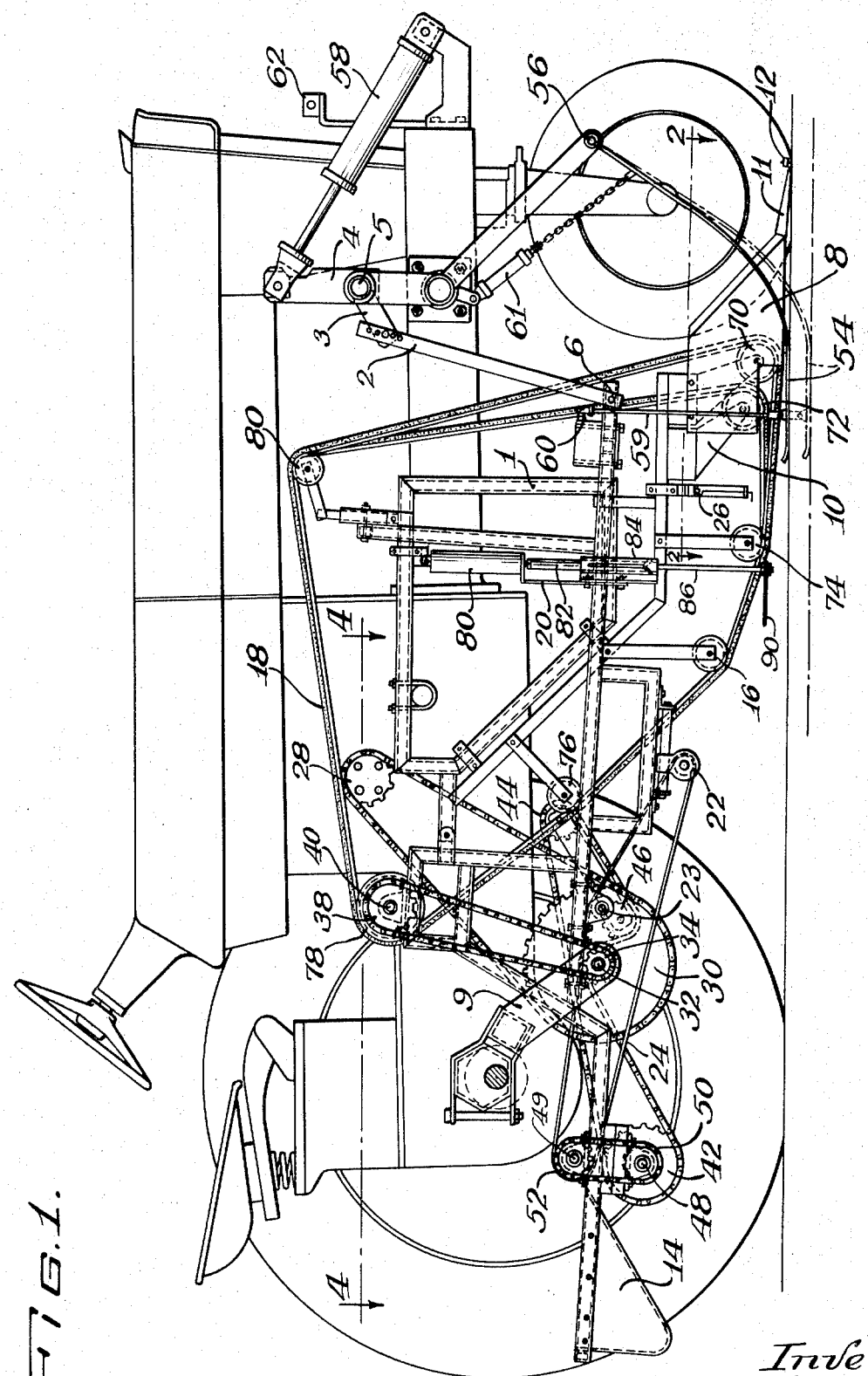

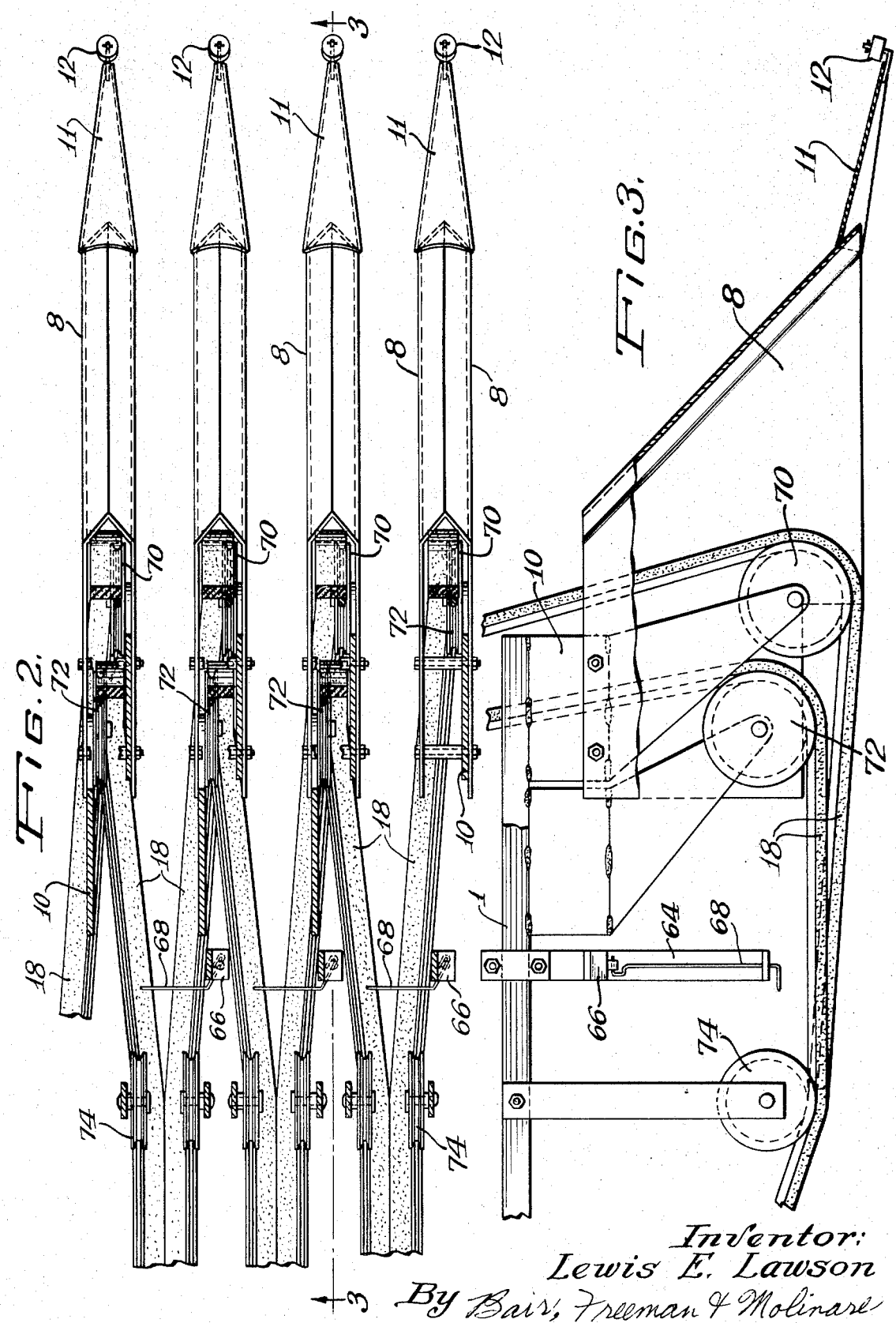

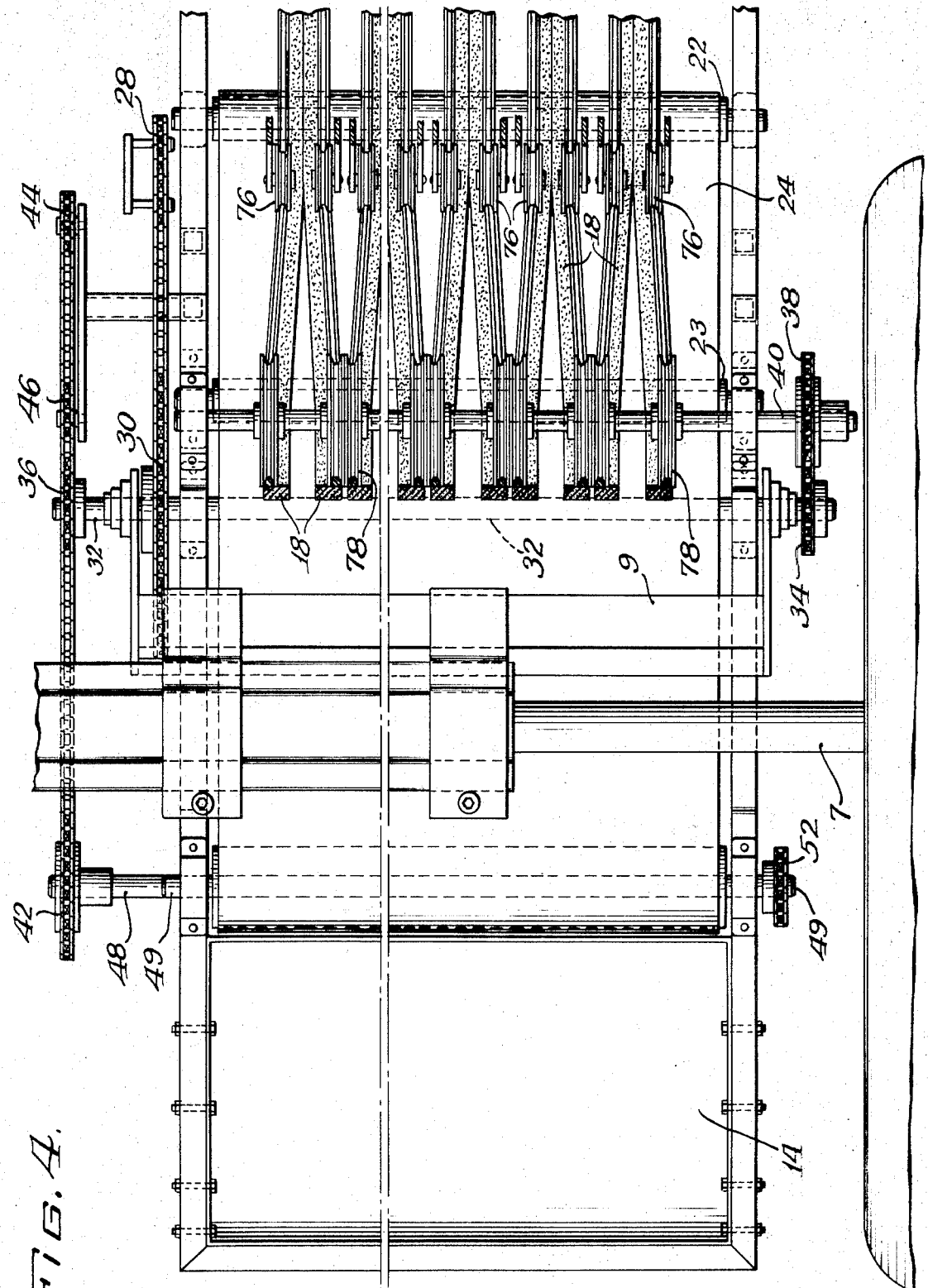

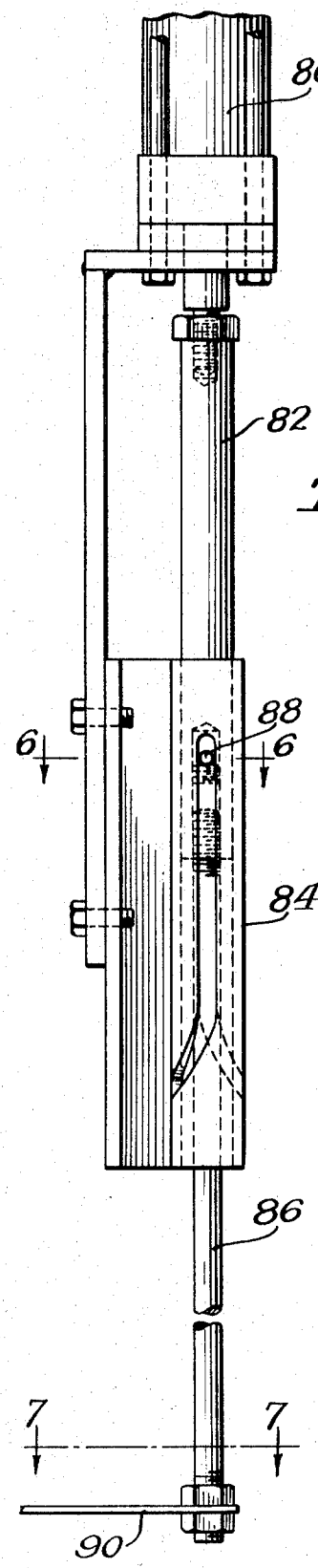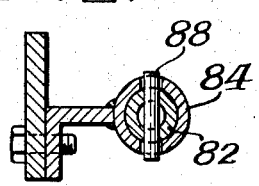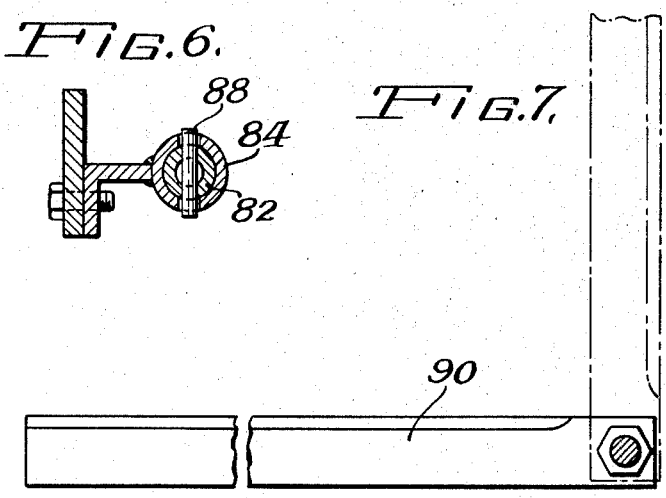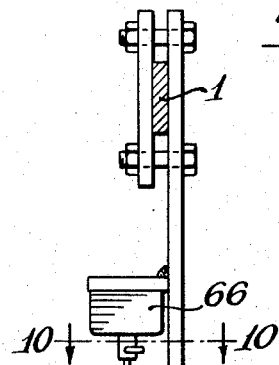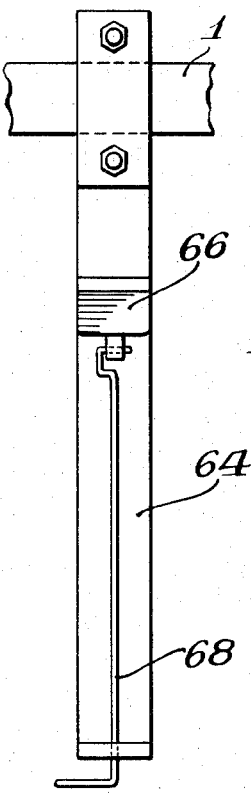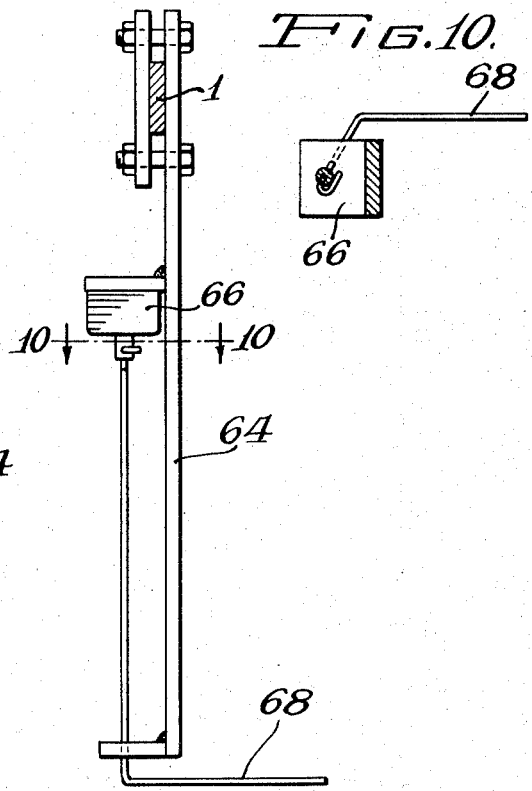

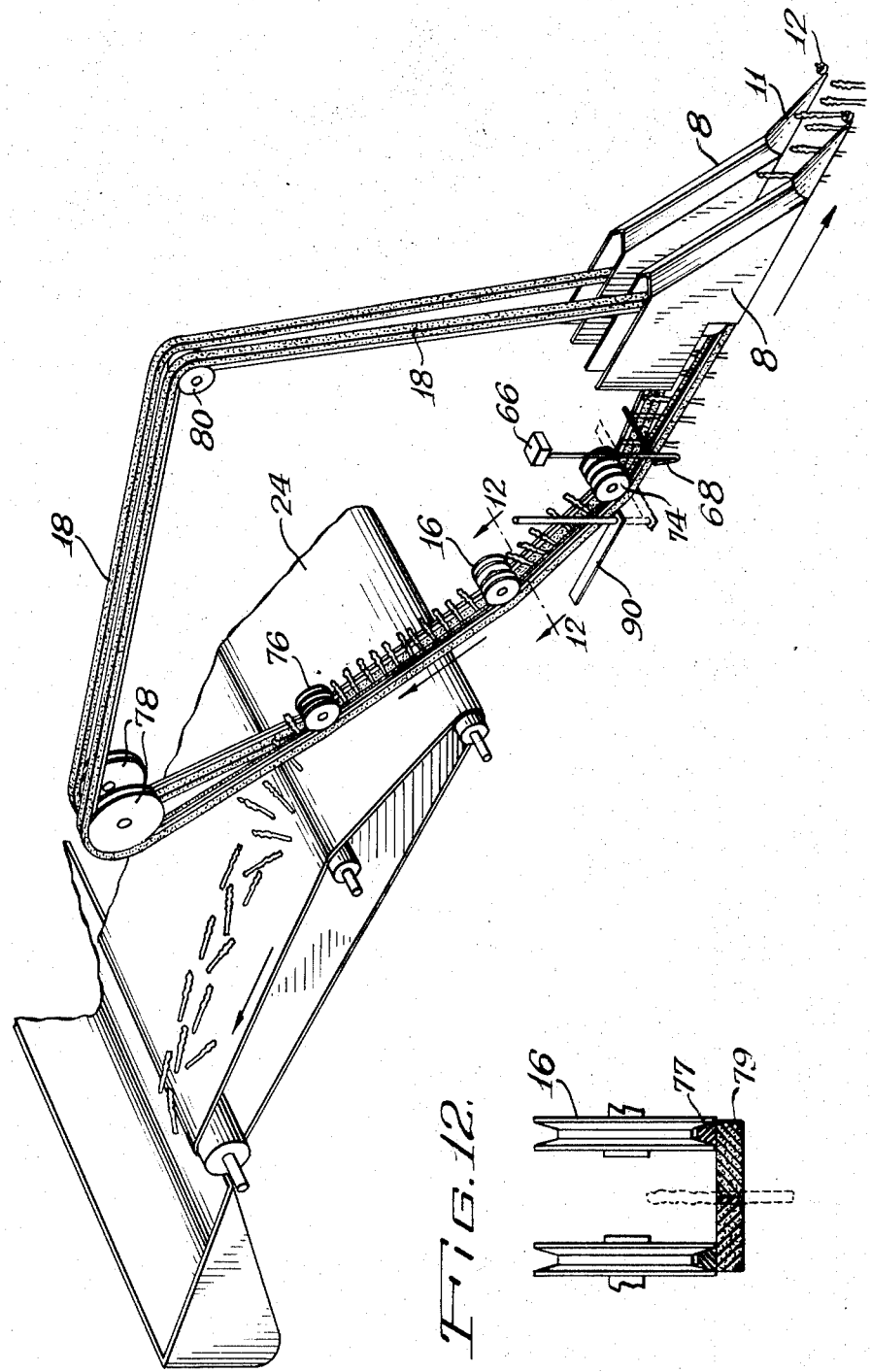

Inventor:
Lewis E. Lawson
By Bair, Freeman & Molinare
Attys.

ASPARAGUS HARVESTER

This invention relates to a novel apparatus and method for harvesting asparagus. In particular, the invention relates to such apparatus and method whereby asparagus spears are harvested simply and efficiently and with a minimum of mechanical damage to the spears.

By way of background, asparagus fields are normally planted with the asparagus plants in rows spaced about 60 inches apart. During the early years of growth, the plants grow in rows as planted. As the field ages, the crowns of the plants continually expand in area so that after about 5 years, each row as planted is actually a bed about 2 feet wide with virtually no open space between crowns in the row. This expansion process continues through the life of the field, which may be as much as 20 to 25 years. Maximum bed width is limited by cultivation to about 36 inches, which leaves a space between beds of about 24 inches.

To obtain the greatest economic return, it is necessary to remove and harvest only spears about seven inches or greater in length while not damaging shorter spears. Growth rate of the spears varies according to temperature, moisture, sunlight and depth of crown. The result is a random pattern of spears across a 36 inch bed, with tall and short spears occurring adjacent to each other, and no definable row as such term is normally used in connection with annual vegetables.

The spears are susceptible to mechanical damage of two types: damage to the spears being harvested or damage to shorter spears which would normally be harvested later. Damage to a harvested spear, if severe enough, can cause rejection by inspectors as a cull. If damage is minor, it can reduce the spear from whole-spear grade to "cut grass", which is worth considerably less on the market. Damage to a growing spear usually results in abnormal subsequent growth, with some degree of deformation. In most cases, the damaged spear is a cull by the time it reaches harvest size.

There have been proposed various machines for selectively harvesting asparagus spears all of which are unduly complicated in construction or operation and none of which are designed to handle the spears to be harvested with sufficient care to avoid mechanical damage to the spear. The machines employed heretofore use various means for sensing spears of the proper height, then sever the stalks by means of a moving blade or wire. Usually the blade strikes the stalk in a chopping action which often splinters the stalk and deforms the spear. The stalks are then scooped up before striking the ground and loaded into a storage hopper. Such method results in many damaged stalks, either from the chopping cutting action or damage to the spear during subsequent handling.

It is thus the object of this invention to provide an apparatus and method for selectively harvesting asparagus spears efficiently and simply and without damaging either the harvested spears or the shorter spears not yet ready for harvesting.

Broadly, the apparatus and method of my invention is based upon finding that asparagus can be most efficiently harvested if the stalks are held gently but firmly in substantially vertical disposition and are then severed while so held by a cutting blade which is moving at the ground speed of the harvester apparatus. In this way, the knife blade does not shatter or otherwise deform the stalk being cut and the stalk is efficiently and simply cut since the upper portion is held rigid against the moving knife. After cutting, my apparatus and method provide for transporting the severed spears while still held gently but firmly to a storage area where they are dropped butt-end first to avoid damage to the spear. Thus my method and apparatus for performing it ensure that the spear is subjected to a minimum of handling prior to processing and that the necessary handling causes no mechanical damage to the spears.

In addition, my invention provides apparatus for eliminating damage to shorter stalks by ensuring that the cutting blade and other mechanical elements of the apparatus are maintained at a minimum height from the ground at all times.

In the drawings which illustrate my invention:

FIG. 1 is a side elevation of the right-hand portion of the harvester shown attached to a tractor;

FIG. 2 is a view along line 2—2 of FIG. 1 showing the forward lower portion of the harvester;

FIG. 3 is a view along line 3—3 of FIG. 2;

FIG. 4 is a view along line 4—4 of FIG. 1 showing the after portion of the harvester;

FIG. 5 is an exploded view showing the knife-blade and cutter actuating mechanism of the invention;

FIG. 6 is a view along line 6—6 of line 5;

FIG. 7 is an exploded view showing the knife cutter blade and its mode of movement for operation;

FIG. 8 is an exploded side elevation of the sensing means of the apparatus;

FIG. 9 is a front elevation showing the sensing means of the invention;

FIG. 10 is a view along line 10—10 of FIG. 9;

FIG. 11 is a perspective view showing one unit of the apparatus and its mode of operation;

FIG. 12 is a view along line 12—12 of FIG. 11 showing the belt means by which the asparagus spears are held during cutting and subsequent transportation to storage;

Figure 13:
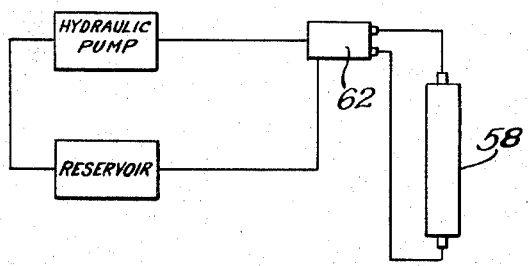
FIG. 13 is a diagrammatic sketch showing the hydraulic leveling system of the apparatus.

For purposes of simplified explanation, the apparatus of my invention will be described in terms of five sections: the support frame and driving mechanism section; the leveling mechanism section for adjusting the height of the harvester off the ground; the sensing device section for sensing at a preselected height those spears which are to be cut; the asparagus spear holding and transporting section for holding the spears before, during and after cutting and transporting the cut spears to a storage hopper; and the cutting section for severing the spears which are selected for harvesting.

SUPPORT FRAME AND DRIVE MECHANISM

The apparatus consists of a frame shown generally at 1 in FIG. 1 which supports a plurality of individual harvester units arranged side by side to cover a full asparagus bed width. The embodiment shown in FIG. 2 shows three such units, FIG. 4 five such units, each unit being preferably about 4 inches wide. However, it should be understood that the units may vary in width and the number of units will depend upon the bed width. The apparatus shown in FIG. 1 illustrates the harvester as it is seen on the right-hand side of a tractor. A like unit may be placed on the left-hand side of the tractor so that two beds may be harvested simultaneously.

As will become evident hereinafter, each unit consists of a pair of endless belts supported by idler wheels which revolve within the unit structure, a sensing means and cutting means independently operable as later described and a pair of dividers which separate the unit from its neighbor and divide and guide the spears to pass between respective belts.

Frame 1 is secured to the tractor through support arm 2 and link 3 to pivot arm 4 which pivots around point 5 as shown in FIG. 1. Support arm 2 is pivotally secured to the lower front of frame 1 at pivot point 6 and the frame is raised or lowered by pivot about point 6 as pivot arm 4 is moved back and forth by cylinder 58 as described hereinafter. The rear of frame 1 is secured by suitable coupling means to the axle of the tractor 7 through bracket 9 and the frame is free to pivot around main drive shaft 32 as the fulcrum for up and down movement of pivot point 6. Frame 1 thus pivots around drive shaft 32 which is journaled not only to frame 1 but also to bracket 9 which in turn is rigidly fastened to the rear axle housing.

At the forward lower end of frame 1 are a plurality of divider plates 8 which are secured to the frame through brackets 10 (FIG. 3). Pairs of divider plates 8 converge at their forward ends through cups 11 and are provided with rollers 12 which serve to divide and separate the asparagus stalks as the harvester apparatus moves through a bed. At the rear of frame 1 is hopper 14 into which the cut asparagus spears are dumped after cutting and conveying on conveyor belt 24.

Supported by frame 1 are a plurality of idler rollers 16, 74, 72, 70, 80 and 76 which support belts 18 and also frame 1 supports the blade actuator and cutter mechanism shown generally at 20 and described in detail hereinafter. Frame 1 also supports idlers 22 and 23 which guide conveyor belt 24 for transporting the cut asparagus spears to hopper 14. Sensor mechanism shown generally at 26 is supported by frame 1 as in FIG. 1.

The harvester apparatus is powered by drive sprocket wheel 28 which is secured to the end of a drive shaft (not shown) from the tractor. Sprocket 28 is connected by chain linkage to follower sprocket wheel 30 which is secured to and rotates with shaft 32. Shaft 32 acts as a common drive shaft for sprockets 34 and 36 (FIG. 4) and as rear pivot for frame 1. Sprocket 34 is connected by chain linkage to sprocket 38 which rotates drive shaft 40 and runs belts 18 through pulley wheels 78. Sprocket 36 (FIG. 4) is connected by chain linkage to sprocket 42 and idler sprockets 44 and 46. Sprocket 42 drives shaft 48 to which is attached at its outer end sprocket 50 (FIG. 1). Above sprocket 50 is sprocket 52 (FIG. 4) which through a chain linkage is driven by sprocket 50. Rotation of sprocket 52 drives conveyor shaft 49 and moves conveyor belt 24 around idler wheels 22 and 23.

The gear ratio of drive sprocket 28 and the various driven sprockets is such that belts 18 are rotated to move at substantially the same linear rate as the ground speed of the tractor.

THE LEVELING MECHANISM

Figure 14:
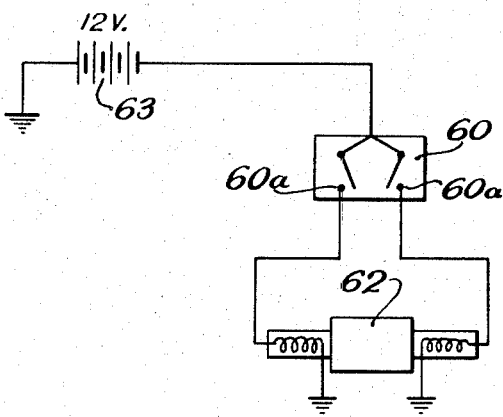
FIG. 14 is a diagrammatic sketch showing the electrical circuit which controls the hydraulic leveling system.
Figure 17:
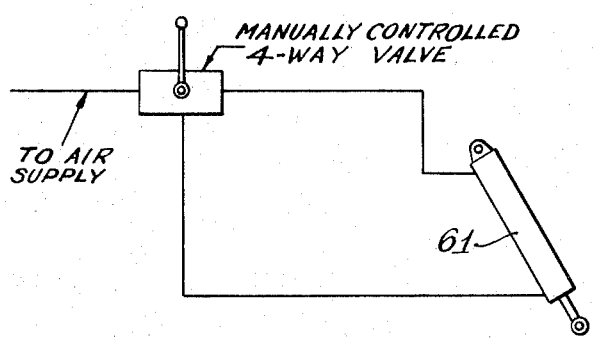
FIG. 17 is a diagrammatic sketch showing the manual pneumatic control system for the feeler runner of the leveling system.

The leveling mechanism which maintains the harvester at substantially constant height above the ground comprises basically a feel runner 54 (FIG. 1) which contacts the ground along the outside edge of the outboard harvester unit on both sides of the tractor. The feeler runner is pivoted at point 56. Manual control of frame height for turning at row ends and for transport is accomplished by means of an adjustable pneumatic cylinder 61 which is attached to the runner through any suitable linkage, preferably a chain linkage as shown in FIG. 1. During the harvesting operation cylinder 61 is extended, allowing feeler 54 to follow the ground surface. Extension or retraction of cylinder 61 is accomplished by means of a manually controlled four-way valve, shown diagrammatically in FIG. 17. On feeler 54 along the ground level is attached link rod 59 which extends up to electric switch 60. Switch 60 is connected by suitable wiring shown diagrammatically in FIG. 14 to a four-way double solenoid valve which controls hydraulic cylinder 58 as shown diagrammatically in FIG. 13. Valve 62 is powered by a 12-volt battery 63 which may be supported at any suitable place on the tractor, as may be the hydraulic pump and reservoir shown diagrammatically in FIG. 13. The components of the electrical and hydraulic systems shown diagrammatically in FIGS. 13 and 14 are old and well known in the art and in themselves form no part of the present invention.

As can be seen in FIG. 1, when feeler runner 54 moves up or down in response to a level change in the ground surface, switch 60 is closed at either contact 60a or 60b and hydraulic valve 58 is actuated through solenoid 62 to either retract or extend the piston shaft. Pivot arm 4 is then actuated accordingly around pivot point 5 which in turn moves pivot point 6 up or down thus raising or lowering the frame of the harvester. Switch 60 is opened when the frame is adjusted to the original present level and runner 54 is at neutral position. In this manner the frame is kept at a constant level above the ground.

SENSING DEVICE

The sensing device shown generally at 26 in FIG. 1 comprises a support arm 64 which is secured to frame 1 by suitable clamping means as shown in FIGS. 8 and 9. It should be understood that each harvester unit is provided with a separate sensor device, all of which operate independently of one another. This is best illustrated in FIG. 11 which shows one sensor in the channel of each unit. Attached to support arm 64 is a rotary switch 66 from which subtends wire sensor 68. The bottom portion of wire sensor 68 is parallel to the ground and runs along an asparagus bed at preferably about 7 inches above the ground or at whatever height is desired for harvesting. The mode of travel of wire 68 is best seen in FIG. 10. Upon striking an asparagus spear of suitable height, wire 68 is displaced 90 degrees and rotary switch 66 is thereby closed. Switch 66 is in a primary electrical circuit with battery 94 (FIG. 16) and the operation of such circuit will be described hereinafter under the heading ELECTRICAL CONTROL CIRCUIT.

BELT HOLDING AND TRANSPORT SECTION

The belt transport system consists basically of a plurality of pairs of endless belts which revolve in parallel vertical planes in adjacent units. The belts are guided by a plurality of rollers or pulleys (best seen in FIG. 11) which cause the belts to alternately converge and diverge to grasp and support asparagus spears to be cut and later to drop the cut spears on conveyor belt 24. As best seen in FIG. 2, the belts for adjacent units are housed at their forward ends between divider plates 8 and are guided therebetween by idler wheels 70 and 72. As the belts approach idler wheels 74 they converge as shown in FIG. 2 and remain converged as they pass over idlers 16 and 76 (FIG. 11). Upon passing idler 76, the belts diverge up over idler wheels 78 and remain diverged past wheels 80 and back down to wheels 70 and 72.

The belts are made by fastening foam rubber strips 79 (FIG. 12) to the back of "A" section V-belts 77 so that the internal edges of the foam contact one another when the belts are mounted in adjacent idler wheels. The foam rubber is sufficiently flexible to grip an asparagus spear passing between the belt without damaging the spear. The belts may alternatively be molded of e.g. neoprene with the contacting portions having a plurality of projecting intermeshing fingers to grip the asparagus spears gently without damaging the spears.

CUTTING BLADE AND MECHANISM

The cutter blade mechanism comprises a vertically oriented hydraulic cylinder 80 secured to frame 1. Like the sensors, there is a separate cutter mechanism for each harvester unit, all independently operable. Attached to the piston of cylinder 80 is connecting shaft 82 (FIG. 5) which is secured inside housing cylinder 84 to blade shaft 86. At the bottom of shaft 86 is secured a cutting blade 90. Cylinder 84 is grooved longitudinally in its surface and acts as a guide tube for pin 88 which projects through shaft 86. The vertical groove in cylinder 84 has a helical section at its lower end which acts as a cam to rotate shaft 86 by 90° as the shaft is extended down. FIG. 7 shows the 90° movement of the blade 90 as shaft 86 is extended to its lower position.

Figure 15:
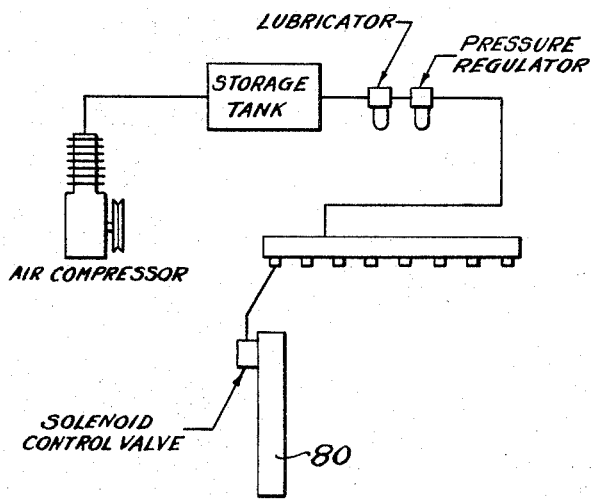
FIG. 15 is a diagrammatic sketch showing the pneumatic system of the blade cutter mechanism.

Knife blade 90 is raised and lowered by means of hydraulic cylinder 80 which in the embodiment shown is operated by compressed air. The cylinder is operated by a single solenoid valve which is a spring return unit. I.e. when the solenoid is energized, the cylinder extends and when de-energized, the return side of the cylinder is pressurized. The compressed air system is shown diagrammatically in FIG. 15 and in itself forms no part of my invention, since all the elements are well known in the art. The air compressor and storage tank may be carried at any suitable place on the tractor.

ELECTRICAL CONTROL CIRCUIT

Figure 16:
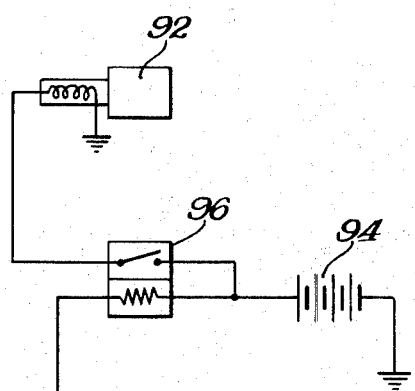
FIG. 16 is a diagrammatic sketch showing the electrical circuit which controls blade cutter mechanism.

The sensor and knife blade mechanism are controlled and operated by means of an electrical circuit shown diagrammatically in FIG. 16. The system is powered by any conventional DC source, preferably a 12-volt battery shown at 94. At 96 is shown schematically a time delay relay whose primary circuit is energized upon closing switch 66 in response to sensor wire 68 contacting an asparagus spear to be harvested. The secondary circuit through relay 96 is then energized which closes solenoid 92 and actuates air cylinder 80 to force the blade cutter mechanism downward. The secondary circuit which controls the solenoid valve remains closed for a preset delay period and then snaps open. The delay setting used will depend upon the ground speed of the harvester, the reaction speed of the cutter mechanism, and the distance between the sensor and the cutting blade. At 3 m.p.h., the setting presently used is 0.2 second, which time is predicated upon allowing the blade to remain in cutting position while the harvester travels about 5 inches along the ground.

After striking a spear of suitable height, sensor wire 68 returns to its normal position ready to sense another spear. If during the time delay, the wire 68 strikes another spear of sufficient height to be harvested, the primary circuit is again actuated through switch 66 and the time delay cycle is started anew. This insures that the cutter stays down to cut the later-sensed spear.

OPERATION

The operation of the apparatus is best understood by reference to FIG. 11 which shows one unit. As the harvester moves along a row or bed of asparagus having some spears of sufficient height to be harvested, belts 18 are caused to move at a peripheral speed equal to the machine's ground speed. As the machine progresses through the bed, rollers 12 guide the spears between divider plates 8 into respective units and between the pick-up belts. As the belts converge, the spears are caused to lean toward the center of the lane.

When sensing arm 68 reaches a spear of sufficient height, the arm is rotated 90° by contact with the spear, closing switch 66 and the primary circuit of time delay relay 96 (FIG. 16). In turn, the secondary circuit is energized and solenoid 92 actuates the air valve 92, and compressed air is fed into the upper end of cylinder 80 forcing shaft 82 downward to place knife blade 90 into position for cutting by rotating shaft 86 along the cam slots to a position 90° from the normal retracted position.

Meanwhile, the sensing wire 68 has passed the first-contacted spear and returned to normal position, opening switch 66. The secondary circuit remains closed for the time delay period during which time the cutting blade is in downward operating position. During the delay time, the knife edge reaches and cuts the earlier sensed spear which is held upright between the rubber foam surface 79 of belt 18. The severed spear or spears remains hanging between the pick-up belts and is transported upwardly to a position above the conveyor where the belts diverge (rearward of idler wheels 76) and the spear is dropped butt-end first onto conveyor belt 24. When the time interval of the time delay expires, the secondary circuit opens and the air cylinder shifts back to normal raised position by providing compressed air to the lower part of the cylinder forcing the piston upward.

If during the time delay period while the secondary circuit is closed and the knife blade extended sensor 68 strikes another spear of proper height for harvesting, switch 66 is again closed actuating the primary circuit and resetting the time delay for a new period.

The apparatus and method of my invention as above described has proved to be of considerable value in producing undamaged asparagus spears. This results from the technique noted hereinbefore by which my apparatus holds the spears in vertical position between the revolving belts and then cuts the stalk with a knife blade moving at the ground speed of the harvester. This provides a gentle cutting action with the stalk supported vertically rather than a slashing or hacking action which may damage the stalk.

Those skilled in the art will recognize that various modifications can be made in my apparatus and method within the scope and spirit of my invention which I intend to be limited solely by the appended claims.

I claim:

1. An apparatus for harvesting asparagus wherein the apparatus includes a movable frame, cutting means mounted on said frame for severing asparagus spears of a selected height as said movable frame travels in a selected direction at a selected speed in an asparagus field, the improvement comprising a cutting portion on said cutting means, support means on said frame for said cutting means, hydraulic means for selectively moving said cutting means between a first position and a second position, a time delay relay means actuated by a sensing means adapted to contact asparagus spears of preselected height for control of said hydraulic means, said first position being raised and inoperative and said cutting portion being parallel to the said direction of travel, said second position being lowered and operative and said cutting portion being transverse to the said direction of travel for the severing of said asparagus spears, said support means maintaining said cutting means at the selected speed of said movable frame while said cutting means are in the cutting position, a pair of substantially horizontal endless belts with mating edges for firmly and gently gripping said spears in a substantially vertical position therebetween before, during, and after said cutting means severs said asparagus spears, said belts being in a plane substantially parallel with the direction of movement of said frame, said first position of said cutting means being laterally mounted on said pair of endless belts with said cutting portion being substantially parallel with the said plane of said belts and said second position of said cutting portion being below said belts and transverse thereto.

2. The improvement of claim 1 wherein a plurality of said pairs of endless belts and a plurality of said cutting means are spaced apart in side by side relationship on said frame.

3. The improvement of claim 1 wherein at least said mating edges comprise a resilient material for firmly yet gently gripping said asparagus spears.

* * * * *